Feb. 18, 1958    R. A. W. MAVRODINEANU    2,823,984
FLUORIDE ION INDICATOR AND PROCESS OF DEVELOPMENT
Filed Jan. 18, 1955

INVENTOR.
RADU A. W. MAVRODINEANU
BY
ATTORNEYS

United States Patent Office 2,823,984
Patented Feb. 18, 1958

2,823,984

FLUORIDE ION INDICATOR AND PROCESS OF DEVELOPMENT

Radu A. W. Mavrodineanu, Yonkers, N. Y., assignor to Boyce Thompson Institute for Plant Research, Inc.

Application January 18, 1955, Serial No. 482,549

3 Claims. (Cl. 23—232)

This invention relates to indicators for the detection of fluoride ions in the atmosphere, or other gases or gas mixtures, and a process of detecting and quantitatively determining the amounts of fluoride ions in such gases. The invention provides an indicator comprising a carrier medium having absorbed or coated thereon a mixture or combination of either zirconium or thorium nitrate and a lake-forming dye, and a process of developing the indicator to make quantitative determinations for fluoride ions.

The invention is particularly effective in detecting and determining the amounts of fluoride ions of such compounds as HF, $SiF_4$, $H_2SiF_6$, and the like, when carried in the atmosphere or in industrial gases. The invention has the distinction that it is specific to fluoride ions alone and is not adversely affected by other compounds such as chlorine, sulfur dioxide, carbon dioxide, even when present in high concentration, up to several parts per million. The indicator is used in a dry state, and is unaffected by light or moisture, and is later developed in an acid solution to bring out the color changes which quantitatively show the amount of fluoride ions contacted by the indicator.

The British patent to Fagan, No. 566,389, describes the preparation of an indicator for hydrogen fluoride comprising an absorbent body, such as paper, which is impregnated with a mixture of zirconium nitrate and the dye sodium alizarin sulfonate (Alizarin S). It is known also to use indicators consisting of zirconium nitrate and Alizarin S in aqueous solutions for the determination of fluoride ions by titration in acid solutions.

In accordance with my invention, I impregnate an absorbing medium such as filter paper, blotting paper, and the like, first with an aqueous solution of either zirconium nitrate or thorium nitrate, and then with an aqueous solution of a suitable dye such as sodium alizarin sulfonate, and then dry the impregnated medium. One of the important features of my invention is that a part of the impregnated sheet is covered with a removable material which is impervious to fluoride ions, so that when the sheet is exposed to a fluoride-containing gas, only part of the sheet is contacted, the covered part of the sheet providing a control for comparative determinations when the sheet is developed. In making determinations according to my invention, the protecting cover is removed after a suitable period of exposure to fluoride ions and the entire sheet is immersed in an acid solution, for example, a $\frac{1}{100}$ N solution of hydrochloric acid. This results in a change in the color of the part of the sheet contacted with fluoride ions which is easily compared with the part unexposed to fluoride ions. Accordingly, my invention provides an indicator medium which contains its own control. The invention also provides a developing process for inducing reactions which accurately and uniformly result in the color changes which can be colorimetrically compared with standardized sheets to show the amount of fluoride ions absorbed in a given time.

It is important in producing the indicator to impregnate the absorbing medium first with the nitrate and then to impregnate it with the solution of dye, because this forms a lake of the dye on the surface of the indicator, resulting in a high concentration of chemicals on the surface, and as a result the indicator is much more sensitive than would be the case if the entire sheet were impregnated. The following are representative dyes which form lakes with zirconium and thorium: sodium alizarin sulfonate, sulfodichlorohydroxy dimethyl-fuchein-dicarboxylic acid (Chrome Azurol S), quinalizarin, purpurin, 1,2,3,5,6,7 - hexahydroxyanthraquinone, anthrapurpurin, flavopurpin, anthragallol and alizarincyanine. The dye known as Chrome Azurol S in the form of a lake on the sheet indicator is pink, but when it is reacted with fluoride ions and then developed in an acid solution it turns blue. The other dyes, such as Alizarin-S, merely change from one shade to another depending on the extent in which the dye has reacted with fluoride ions.

There is nothing critical about the concentration of the nitrate or the dye in the aqueous impregnating solution. A suitable solution of the nitrate can be formed by dissolving about 1.75 g. of either zirconium nitrate or thorium nitrate in 1 liter of water. The dye solution can be formed by dissolving about 1 g. of the dye in one liter of water. Other concentrations may be used, depending on the intensity of color desired.

The absorbing medium, for example, filter paper, blotting paper, fritted glass or other material which has a porous or absorbing surface is first impregnated with the nitrate solution and then impregnated with the dye solution. The indicator is then dried by evaporation of the water. After drying, the indicator sheet is partly covered, preferably on both sides by a dense sheet of preferably transparent removable material such as rubber hydrochloride, cellophane, polyvinyl films or aluminum foil, which will prevent contact of the fluoride compound with the covered portion of the indicator.

Figure 1:
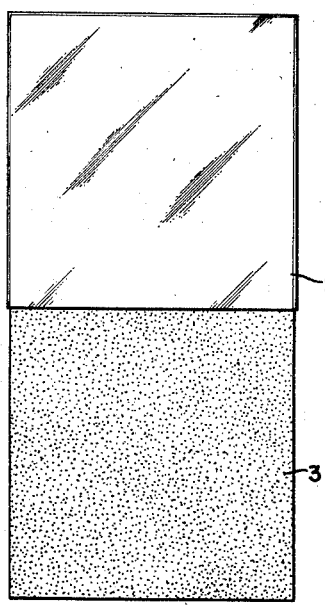
Fig. 1 is a side view of a sheet of indicator of the invention.
Figure 2:
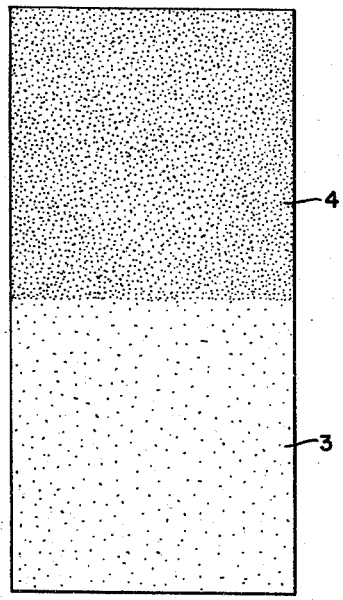
Fig. 2 is a side view of the sheet of Fig. 1 after removal of the cover and after the sheet has been developed.

As illustrated in the drawings, the sheet 1 is a piece of white blotting paper impregnated with the nitrate and dye as previously described, and dried. This sheet may be of any convenient size for suspending in the gas to be tested, for example, two by four inches and about one thirty-second of an inch thick.

The sheet is first dipped in the nitrate solution for about five minutes, and after draining it is put into the dye solution for about ten minutes. A lake forms on the paper surface. After a short rinsing in distilled water, the indicator is dried at 40° to 60° C. Approximately one-half of the dried sheet is covered with an envelope 2 of removable sheet material, say, rubber hydrochloride or cellophane. The indicator may also be made in a continuous narrow sheet and the covering sheet attached lengthwise over, say, one-half the sheet. This sheet may be cut into narrow strips each having an exposed and covered portion. The resulting indicator sheet of the invention is stable and may be kept for long periods without deterioration. When used, it can be attached to a wall, hung in a gas duct, or merely hung in a building or outdoors, protected from the rain.

A preferred manner of use is to expose the indicator sheet for definite periods, for example, for four, ten or twelve hours, and then remove the cover and immerse the sheet for about fifteen minutes in a dilute acid such as hydrochloric acid solution at pH 2, which is about a $\frac{1}{100}$ N solution. The sheet is removed from the acid, rinsed in distilled water and dried at a temperature of from 40° to 60° C. This developing reaction causes the lake of the dye on the exposed part 3 to lose color to a degree proportional to the amount of fluoride ions on the exposed area. The unexposed part 4 of the sheet is not perceptively affected by the development, and retains its original color. Each sheet provides its own control and gives an immediate comparison of the amount of color change, which indicates the presence of fluoride ions on the exposed area of the indicator. When the indicator comprises a lake of Alizarin S, a visible bleaching of the rose color is obtained after an exposure of four hours in an atmosphere containing, for example, sixty parts per billion of fluoride ions by volume. A longer exposure or a higher concentration of ions will further diminish the color.

In making a determination of fluoride ions in air, a known volume of air is drawn through the indicator, for example, at a rate of one hundred and fifty liters per hour per $cm.^2$ of surface, and the corresponding bleaching is measured against the control by means of a reflection meter after having developed the indicator as previously described. The indicator is then analyzed for its fluoride content and a calibration curve can be made by using the weight of fluoride, for example in grams, as abscissa, and the bleaching values of the reflection meter as the ordinates.

The sheets may be produced to precise standards of nitrate and dye concentration and the degrees of color change made by impregnating the sheet with known amounts of fluoride ions. Such sheets can be developed and used to make colorimetric determinations for the amount of fluoride ions in the gas being tested.

I claim:

1. The process of determining the presence of fluoride ions in a gas which comprises suspending in the gas an indicator having an absorbing surface initially impregnated with a nitrate of the group consisting of zirconium nitrate and thorium nitrate and thence impregnated with a dye that forms a lake with the nitrate, whereby said lake is concentrated primarily at the absorbing surface, a portion of said indicator being covered with a removable material which is impervious to the fluoride ions, removing the cover, and immersing the indicator in an acid solution to develop the color change resulting from the contact of fluoride ions with the exposed part of the indicator.

2. In the process of claim 1, immersing the indicator in a solution of hydrochloric acid at a pH of around 2.

3. The process of forming an indicator for the detection of fluoride ions which comprises initially immersing a porous medium having an absorbing surface in a solution of a nitrate of the group consisting of zirconium nitrate and torium nitrate, then immersing the porous medium in a solution of a dye that forms a lake with the nitrate, whereby said lake is concentrated primarily at the absorbing surface, washing the porous medium with water and then drying the porous medium which contains the lake.

References Cited in the file of this patent

UNITED STATES PATENTS

| 691,249 | Dieterich | Jan. 14, 1902 |
| 2,606,102 | Cook | Aug. 5, 1952 |

FOREIGN PATENTS

| 566,389 | Great Britain | Dec. 28, 1944 |

OTHER REFERENCES

Jacobs: "Analytical Chemistry of Industrial Poisons, Hazards and Solvents," pages 394–400. Interscience Publishers, Inc., New York City, 1949, 2nd edition.

Lambert: "Analytical Chemistry," vol. 26, No. 3, March 1954, pages 558–560.